US009285650B2

(12) United States Patent
Sugiyama et al.

(10) Patent No.: US 9,285,650 B2
(45) Date of Patent: Mar. 15, 2016

(54) OPTICAL MODULATING APPARATUS AND OPTICAL TRANSMITTER

(71) Applicant: Fujitsu Optical Components Limited, Kawasaki-shi, Kanagawa (JP)

(72) Inventors: Masaki Sugiyama, Sagamihara (JP); Norihisa Naganuma, Yokohama (JP); Eiichi Kodera, Yokohama (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 394 days.

(21) Appl. No.: 13/973,398

(22) Filed: Aug. 22, 2013

(65) Prior Publication Data

US 2014/0119745 A1    May 1, 2014

(30) Foreign Application Priority Data

Oct. 31, 2012  (JP) .................................. 2012-240309

(51) Int. Cl.
*G02B 6/12* (2006.01)
*G02F 1/225* (2006.01)

(52) U.S. Cl.
CPC ........ *G02F 1/2255* (2013.01); *G02F 2201/126* (2013.01)

(58) Field of Classification Search
USPC .......................................................... 385/14
See application file for complete search history.

(56) References Cited

U.S. PATENT DOCUMENTS

| 2004/0208211 | A1  | 10/2004 | Maruyama et al. |
| 2006/0198569 | A1* | 9/2006  | Ohtsu ................ G02B 6/02042 385/14 |
| 2008/0170819 | A1* | 7/2008  | Kodama ................ G02B 6/138 385/14 |
| 2009/0029570 | A1  | 1/2009  | Ikeuchi et al. |
| 2010/0119192 | A1* | 5/2010  | Fujikata ................ B82Y 20/00 385/14 |
| 2011/0032687 | A1* | 2/2011  | Song ...................... H05K 3/361 361/803 |

FOREIGN PATENT DOCUMENTS

| JP | 2008-187670 | 8/2008 |
| JP | 2003-249711 | 9/2009 |

* cited by examiner

*Primary Examiner* — Eric Wong
(74) *Attorney, Agent, or Firm* — Staas & Halsey LLP (57) ABSTRACT

An optical modulating apparatus includes driver that is mounted on a printed circuit board such that a signal electrode pad and a ground electrode pad of the driver are exposed in an opening of the printed circuit board. An optical modulating device is mounted on the printed circuit board, opposing the driver across the opening. A flexible circuit board is disposed in the opening. An end of a signal terminal of the flexible circuit board is electrically connected to a signal electrode of the optical modulating device. An end of a ground terminal of the flexible circuit board is electrically connected to a ground electrode of the optical modulating device. The other end of the signal terminal is soldered to the signal electrode pad of the driver, and the other end of the ground terminal is soldered to the ground electrode pad of the driver.

15 Claims, 11 Drawing Sheets

OPTICAL MODULATING APPARATUS AND OPTICAL TRANSMITTER

CROSS REFERENCE TO RELATED APPLICATIONS

This application is based upon and claims the benefit of priority of the prior Japanese Patent Application No. 2012-240309, filed on Oct. 31, 2012, the entire contents of which are incorporated herein by reference.

FIELD

The embodiment discussed herein is related to an optical modulating apparatus and optical transmitter.

BACKGROUND

A conventional optical communication module is adapted to absorb position discrepancies between a printed circuit board and the substrate of an optical module that is for transmission or reception, by electrically connecting electrodes of the substrate and electrodes of the printed circuit board through a flexible circuit board (see, e.g., Japanese Laid-Open Patent Publication No. 2003-249711). Meanwhile, another optical communication module is adapted to prevent drops in transmission characteristics consequent to variation of the electrical property of the flexible circuit board caused by the influence of the printed circuit board, by electrically connecting electrodes of the printed circuit board to electrodes of the flexible circuit board through another substrate for relaying therebetween (see, e.g., Japanese Laid-Open Patent Publication No. 2008-187670).

When a flexible circuit board connected to electrodes of an optical modulating device is electrically connected to a driver on a printed circuit board through signal wiring of the printed circuit board, the modulation band becomes narrow because propagation loss is high for a high-frequency signal propagated in the signal wiring of the printed circuit board. The propagation loss results in reduced amplitude of the signal input into the optical modulating device and thus, a higher output driver is necessary to compensate for the reduced amplitude. Consequently, power consumption increases. Mismatching of impedance occurs in each of the soldered portions between the electrodes of the printed circuit board and the electrodes of the flexible circuit board, and the soldered portions between the electrodes of the printed circuit board and lead pins of the driver. Thus, an incident wave reflection coefficient S11 is degraded.

The electrodes of the flexible circuit board connected to the electrodes of the optical modulating device may be directly soldered to the lead pins of the driver rather than through a printed circuit board. By doing this, propagation loss that occurs when a high-frequency signal propagates in the signal wiring of the printed circuit board is eliminated, whereby the narrowing of the modulation band can be suppressed. The reduction of the amplitude of the signal input into the optical modulating device can be suppressed and thus, increases in power consumption can be suppressed. Further, the reduction of one soldered portion improves the incident wave reflection coefficient S11.

Since the optical modulating device cannot withstand high temperatures, a soldering process employing reflow is not applicable to the soldering of the electrodes of the flexible circuit board connected to the electrodes of the optical modulating device, to the lead pins of the driver. Therefore, using a soldering iron, a worker has to manually solder to the lead pins of the driver mounted on the surface of the printed circuit board, the electrodes of the flexible circuit board connected to the electrodes of the optical modulating device.

However, the interval between the driver and the optical modulating device is small because a shorter distance for a high-frequency signal to propagate can suppress greater propagation loss. Therefore, a problem arises in that the worker is unable to insert the tip of the soldering iron between the driver and the optical modulating device when soldering the electrodes of the flexible circuit board connected to the electrodes of the optical modulating device to the lead pins of the driver.

SUMMARY

According to an aspect of an embodiment, an optical modulating apparatus includes a driver that includes a signal electrode pad and a ground electrode pad on a back face of the driver, the signal electrode pad outputting an electrical signal corresponding to modulation data; an optical modulating device that modulates a light beam based on the electrical signal output from the driver; a flexible circuit board that includes a signal terminal and a ground terminal; and a printed circuit board that has an opening penetrating from a front face of the printed circuit board to a back face of the printed circuit board. The driver is mounted on the printed circuit board such that the signal electrode pad and the ground electrode pad of the driver are exposed in the opening of the printed circuit board. The optical modulating device is mounted on the printed circuit board, opposing the driver across the opening of the printed circuit. The flexible circuit board is disposed in the opening of the printed circuit board. An end of the signal terminal of the flexible circuit board is electrically connected to a signal electrode of the optical modulating device. An end of the ground terminal of the flexible circuit board is electrically connected to a ground electrode of the optical modulating device. Another end of the signal terminal of the flexible circuit board is soldered to the signal electrode pad of the driver. Another end of the ground terminal of the flexible circuit board is soldered to the ground electrode pad of the driver.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of an optical modulating apparatus and an optical transmitter will be explained with reference to the accompanying drawings. In the description below, identical components are given the same reference numeral and redundant explanation is omitted.

Figure 1:
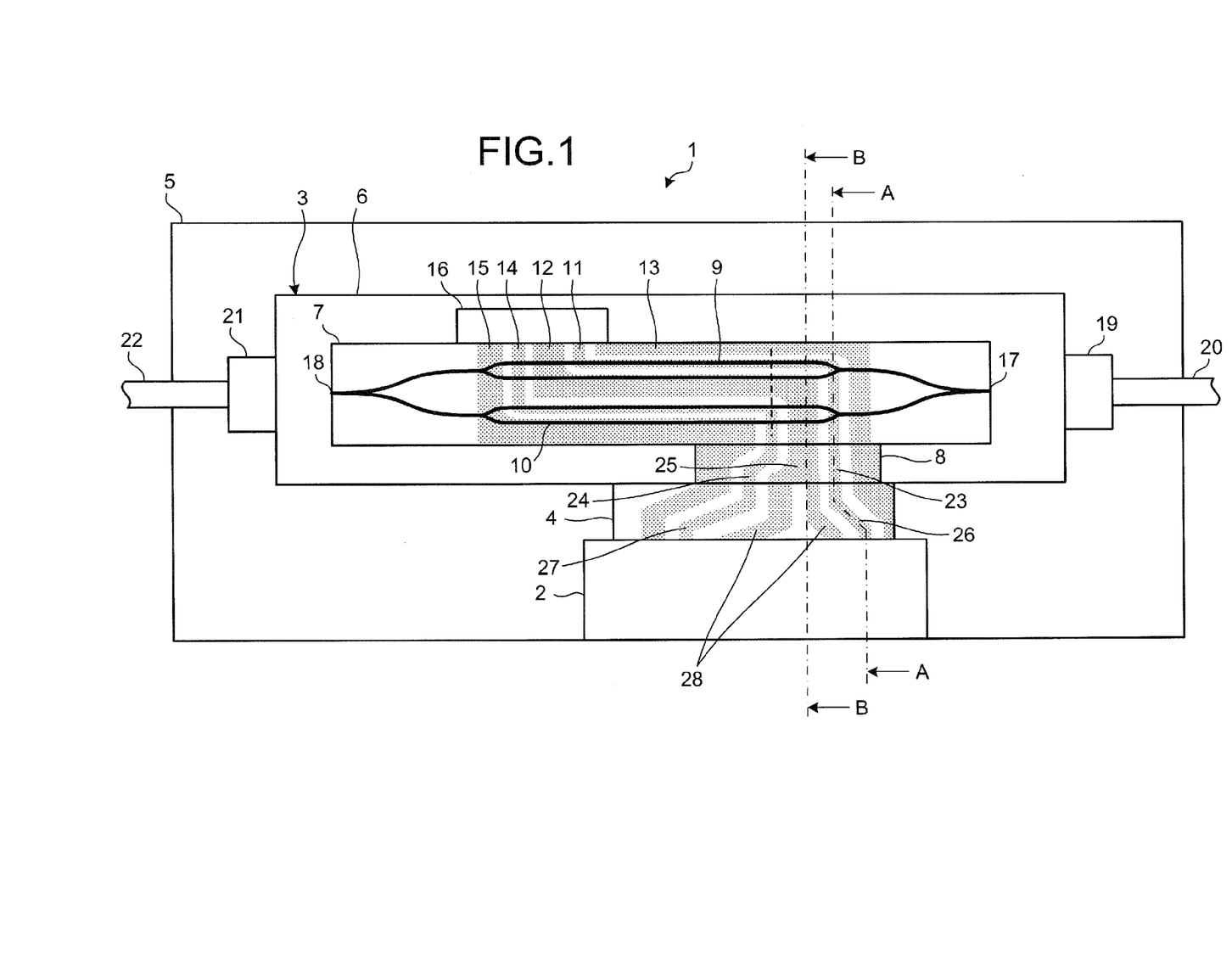
FIG. 1 is an explanatory diagram of a first example of an optical modulating apparatus according an embodiment.

FIG. 1 is an explanatory diagram of a first example of an optical modulating apparatus according the embodiment. The optical modulating apparatus 1 includes a driver 2, an optical modulating device 3, a flexible circuit board 4, and a printed circuit board 5. The driver 2 and the optical modulating device 3 are mounted on the printed circuit board 5.

The driver 2 outputs from a signal electrode pad (not depicted), an electrical signal that corresponds to modulated data. The optical modulating device 3 modulates a light beam, based on the electrical signal output from the driver 2. The flexible circuit board 4 electrically connects the signal electrode pad (not depicted) of the driver 2 to signal electrodes 23, 11, 24, and 14 in the optical modulating device 3 and also electrically connects a ground electrode pad (not depicted) of the driver 2 to ground electrodes 25, 12, 13, and 15 in the optical modulating device 3.

In the optical modulating device 3, a package 6 accommodates a modulating device chip substrate 7 and a relaying substrate 8 that is not the modulating device chip substrate 7. The modulating device chip substrate 7 may be a z-cut crystal substrate having an electro-optical effect such as, for example, LiNbO3 or LiTaO2. An optical waveguide device using such an electro-optical crystal may be formed by forming an optical waveguide by a film of a metal such as Ti on a portion of the crystal substrate and causing the film to thermally diffuse, or by exchanging protons in benzoic acid after patterning; and by disposing electrodes in the vicinity of the optical waveguide.

The modulating device chip substrate 7 has plural Mach-Zehnder optical waveguides 9 and 10 disposed in parallel. In the example depicted in FIG. 1, two Mach-Zehnder optical waveguides 9 and 10 are disposed in parallel. Although the number of Mach-Zehnder optical waveguides disposed in parallel is not limited to two, the embodiment will be described taking an example of a case where the number of the Mach-Zehnder optical waveguides is two.

The first Mach-Zehnder optical waveguide 9 includes an input waveguide, an output waveguide, and a pair of branching waveguides that are disposed between the input waveguide and the output waveguide and that are disposed in parallel. In the first Mach-Zehnder optical waveguide 9, a first signal electrode 11 is disposed along one of the branching waveguides and a ground electrode 12 is disposed along the other branching waveguide. The first signal electrode 11 is sandwiched by the two ground electrodes 12 and 13. The ground electrode 12, the first signal electrode 11, and the ground electrode 13 form a coplanar electrode.

The second Mach-Zehnder optical waveguide 10 includes an input waveguide, an output waveguide, and a pair of branching waveguides that are disposed between the input waveguide and the output waveguide and that are disposed in parallel. In the second Mach-Zehnder optical waveguide 10, a second signal electrode 14 is disposed along one of the branching waveguides and a ground electrode 15 is disposed along the other branching waveguide. The second signal electrode 14 is sandwiched by the two ground electrodes 12 and 15. The ground electrode 15, the second signal electrode 14, and the ground electrode 12 form a coplanar electrode.

When the Z-cut substrate is used as the modulating device chip substrate 7, the first signal electrode 11, a second signal electrode 14, and the ground electrodes 12 and 15 are each disposed immediately above the branching waveguide corresponding thereto. Thereby, the variation of the refraction index caused by the electric field in the Z-direction can be used.

For example, a buffer layer of SiO2, etc. having a thickness of about 0.2 to 2 μm may be disposed between an electro-optical crystal, and the first and the second signal electrodes 11 and 14 and the ground electrodes 12 and 15. Thereby, light beams propagating in the branching waveguides can be prevented from being absorbed by the first and the second signal electrodes 11 and 14 and the ground electrodes 12 and 15.

In an end portion 16 on one side face of the modulating device chip substrate 7, an end of the first signal electrode 11 is connected to an end of the ground electrode 12 through a resistor (not depicted), and an end portion 16 of the second signal electrode 14 is connected to an end of the ground electrode 15 through a resistor (not depicted). Thereby, the first and the second signal electrodes 11 and 14 are travelling wave electrodes.

When a first electrical signal of a microwave and corresponding to the modulated data is applied to the first signal electrode 11, the refraction indexes of the pair of branching waveguides of the first Mach-Zehnder optical waveguide 9 are varied by $+\Delta n1$ and $-\Delta n2$ by the generated electric field. Thereby, the phase difference is varied between the pair of branching waveguides of the first Mach-Zehnder optical waveguide 9, and a signal light beam output from the output waveguide of the first Mach-Zehnder optical waveguide 9 is intensity-modulated by Mach-Zehnder interference.

When a second electrical signal of a microwave and corresponding to the modulated data is applied to the second signal electrode 4, the refraction indexes of the pair of branching waveguides of the second Mach-Zehnder optical waveguide 10 are varied by $+\Delta n3$ and $-\Delta n4$ by the generated electric field. Thereby, the phase difference is varied between the pair of branching waveguides of the second Mach-Zehnder optical waveguide 10, and a signal light beam output from the output waveguide of the second Mach-Zehnder optical waveguide 10 is intensity-modulated by the Mach-Zehnder interference.

The effective refraction index of the microwave can be controlled by varying the cross-sectional shapes of the first and the second signal electrodes 11 and 14. Thereby, the speeds of the light beam and the microwave can be matched with each other and a high-speed optical response property can be acquired. The optical modulating device 3 depicted in FIG. 1 can generate a multi-level modulation signal because the first and the second electrical signals are different from each other.

An input light beam branching unit 17 and an output light beam wave coupling unit 18 are formed on the modulating device chip substrate 7. An optical input end of the input light beam branching unit 17 may be connected, for example, to an optical fiber 20 through a connector 19. Of the input light beam branching unit 17, one optical output end is connected to the input waveguide of the first Mach-Zehnder optical waveguide 9 and the other optical output end is connected to the input waveguide of the second Mach-Zehnder optical waveguide 10. The input optical branching unit 17 branches an input light beam input from the optical fiber 20 through the connector 19 into, for example, two light beams at an intensity ratio of, for example, 1:1 and outputs the resulting light beams to the input waveguides of the first and the second Mach-Zehnder optical waveguides 9 and 10.

One optical input end of the output light beam wave coupling unit 18 is connected to the output waveguide of the first Mach-Zehnder optical waveguide 9 and the other optical input end is connected to the output waveguide of the second Mach-Zehnder optical waveguide 10. The optical output end of the output light beam wave coupling unit 18 may be connected to the optical fiber 22 through the connector 21. The output light beam wave coupling unit 18 may couple the modulated light beams output from the output waveguides of the first and the second Mach-Zehnder optical waveguides 9 and 10, and may output the coupled light beam to the optical fiber 22 through the connector 21.

The relaying substrate 8 may be a substrate formed of, for example, ceramic and in which plural signal electrodes 23 and 24 that are electrically connected respectively to the first and the second signal electrodes 11 and 14 of the modulating device chip substrate 7 are disposed, and in which the ground electrode 25 that is electrically connected to the ground electrodes 13, 12, and 15 of the modulating device chip substrate is disposed.

Input ends to which electrical signals are supplied are disposed side by side on one side face of the relaying substrate 8, that is, one side face of the package 6. The input electrical signals correspond to the first and the second Mach-Zehnder optical waveguides 9 and 10 of the signal electrodes 23 and 24. In the example depicted in FIG. 1, the input ends of the signal electrodes 23 and 24 are disposed side by side on the lower side face of the relaying substrate 8 in FIG. 1.

The flexible circuit board 4 has plural signal terminals 26 and 27 respectively corresponding to the Mach-Zehnder optical waveguides 9 and 10. Electrical signals corresponding to the first and the second Mach-Zehnder optical waveguides 9 and 10 of the signal terminals 26 and 27 are supplied to input ends that are disposed side by side on one side face of the flexible circuit substrate 4. In the example depicted in FIG. 1, the input ends of the signal terminals 26 and 27 are disposed side by side on the lower side face of the flexible circuit substrate 4 in FIG. 1. However, the flexible circuit board 4 extends to a point beneath the back face of the driver 2 and, in FIG. 1, the lower side face of the flexible circuit substrate 4 is hidden beneath the driver 2 and is not visible.

Output ends of the signal terminals 26 and 27 are disposed side by side on the other side face of the flexible circuit board 4. In the example depicted in FIG. 1, the output ends of the signal terminals 26 and 27 are disposed side by side on the upper side face of the flexible circuit board 4 in FIG. 1. However, the flexible circuit board 4 extends to a point beneath the back face of the optical modulating device 3 and, in FIG. 1, the upper side face of the flexible circuit board 4 is hidden beneath the optical modulating device 3 and is not visible. The flexible circuit board 4 has ground terminals 28 that are electrically connected to the ground electrode 25 of the relaying substrate 8.

The input portions for the electrical signal to the optical modulating device 3 are disposed side by side on one side of the package 6 as above and thereby, for example, the optical modulating device 3 can easily be mounted on the printed circuit board 5. The area for mounting the optical modulating device 3 can be reduced.

Figure 2:
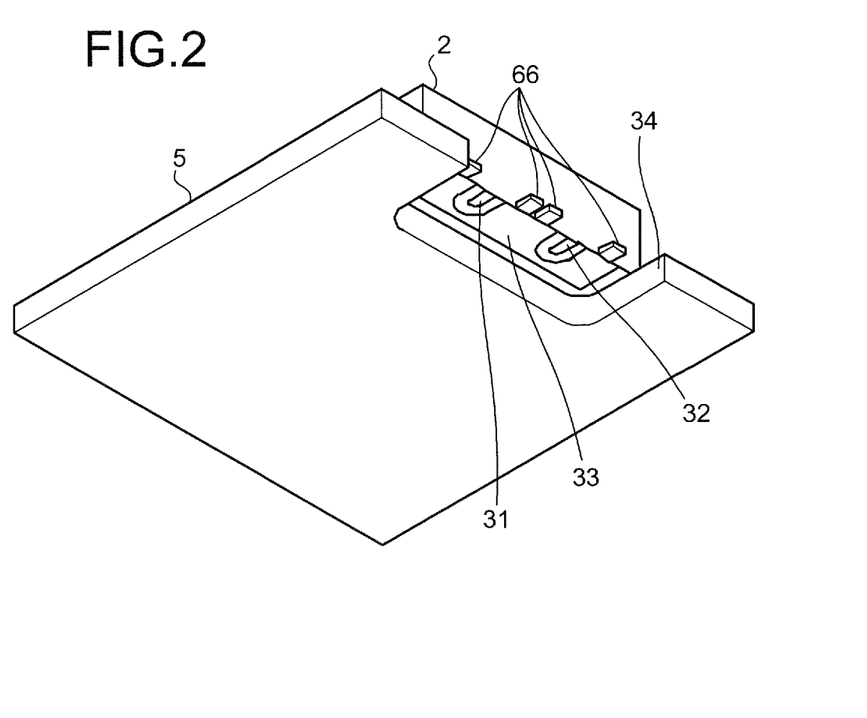
FIG. 2 is an explanatory diagram of an example of components of the optical modulating apparatus according to the embodiment.
Figure 3:
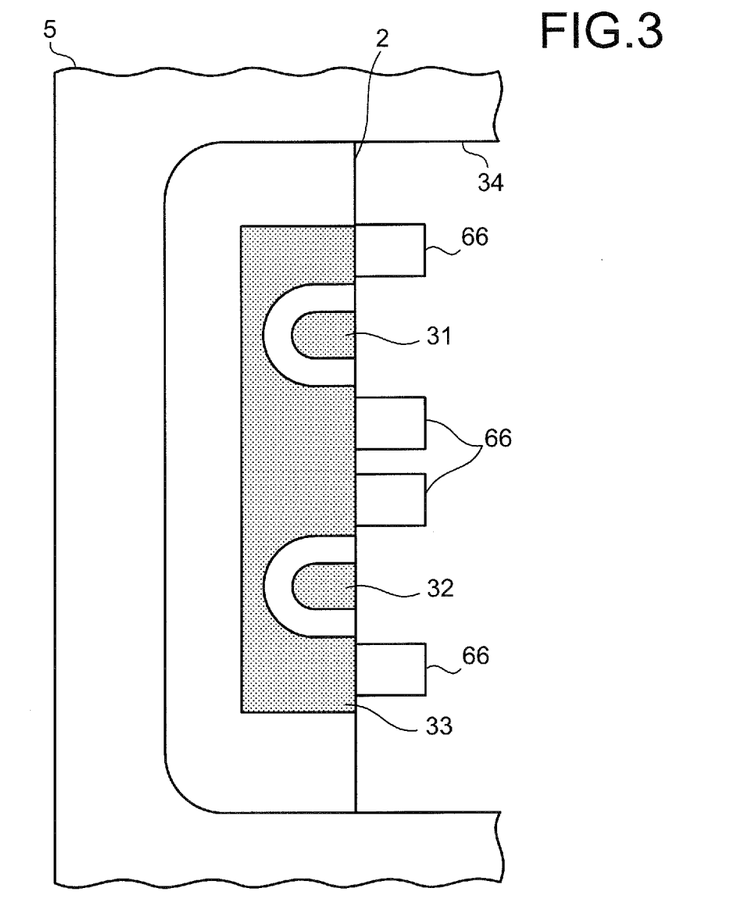
FIG. 3 is an explanatory diagram of an example of a back face of a driver of the optical modulating apparatus according to the embodiment.

FIG. 2 is an explanatory diagram of an example of components of the optical modulating apparatus according to the embodiment and depicts the vicinity of an opening 34 of the printed circuit board 5 as viewed from the back face side of the printed circuit board 5 whose front face has the driver 2 mounted thereon. FIG. 3 is an explanatory diagram of an example of the back face of the driver of the optical modulating apparatus according to the embodiment and depicts a portion of the back face of the printed circuit board 5, and the back face of the driver 2 that is visible through the opening 34 of the printed circuit board 5.

As depicted in FIGS. 2 and 3, the back face of the driver 2 is provided with signal electrode pads 31 and 32 and a ground electrode pad 33. The signal electrode pads 31 and 32, and the ground electrode pad 33 are electrically connected to signal electrodes and a ground electrode (not depicted) in the driver 2. The signal electrode pads 31 and 32 are each sandwiched by the ground electrode pad 33, and the signal electrode pads 31 and 32 and the ground electrode pad 33 form a coplanar electrode. The printed circuit board 5 is provided with the opening 34 that penetrates the printed circuit board 5 from the front face thereof to the back face thereof. The driver 2 is mounted on the front face of the printed circuit board 5 such that the signal electrode pads 31 and 32 and the ground electrode pad 33 on the back face of the driver 2 are exposed on the back face of the printed circuit board 5 at the opening 34 of the printed circuit board 5.

Figure 4:
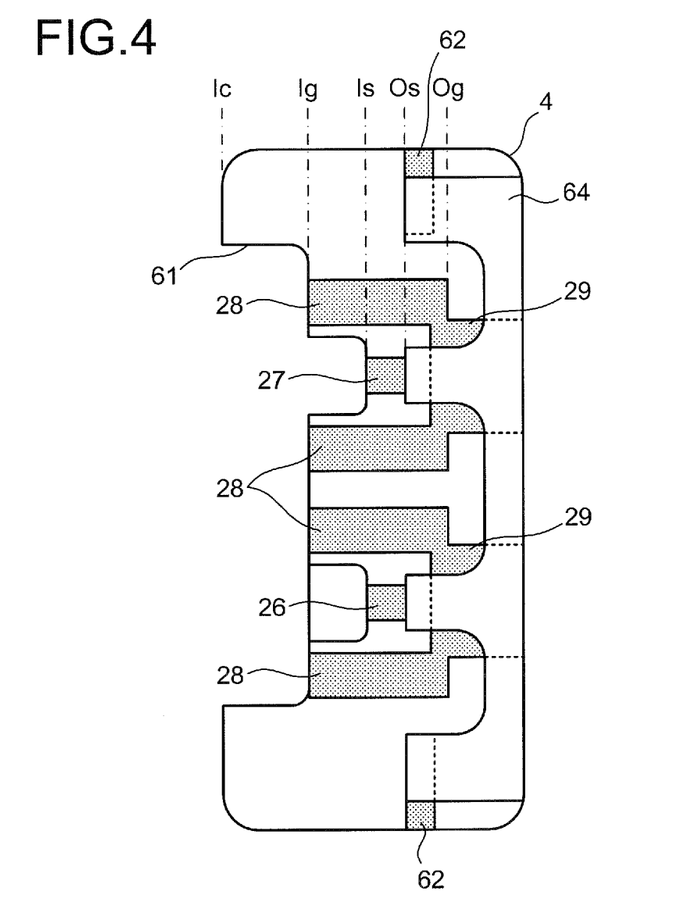
FIG. 4 is an explanatory diagram of an example of a front face of a flexible circuit board of the optical modulating apparatus according to the embodiment.

FIG. 4 is an explanatory diagram of an example of the front face of the flexible circuit board of the optical modulating apparatus according to the embodiment. As depicted in FIG. 4, the front face of the flexible circuit board 4, that is, the face facing the back face of the driver 2, is provided with the signal terminals 26 and 27 and the ground terminals 28. The ground terminals 28 extend to points close to an end of the flexible circuit board 4, on the side facing the optical modulating device 3. In FIG. 4, the end of the flexible circuit board 4, on the side facing the optical modulating device 3 is the right-hand side end thereof. The ground terminals 28 adjacent to each other may be connected to each other by a connecting portion 29 disposed along the end of the flexible circuit board 4, on the side facing the optical modulating device 3. FIG. 4 depicts a simplified drawing and depicts the signal terminals 26 and 27 and the ground terminals 28 as terminals each having a non-winding shape.

Figure 5:
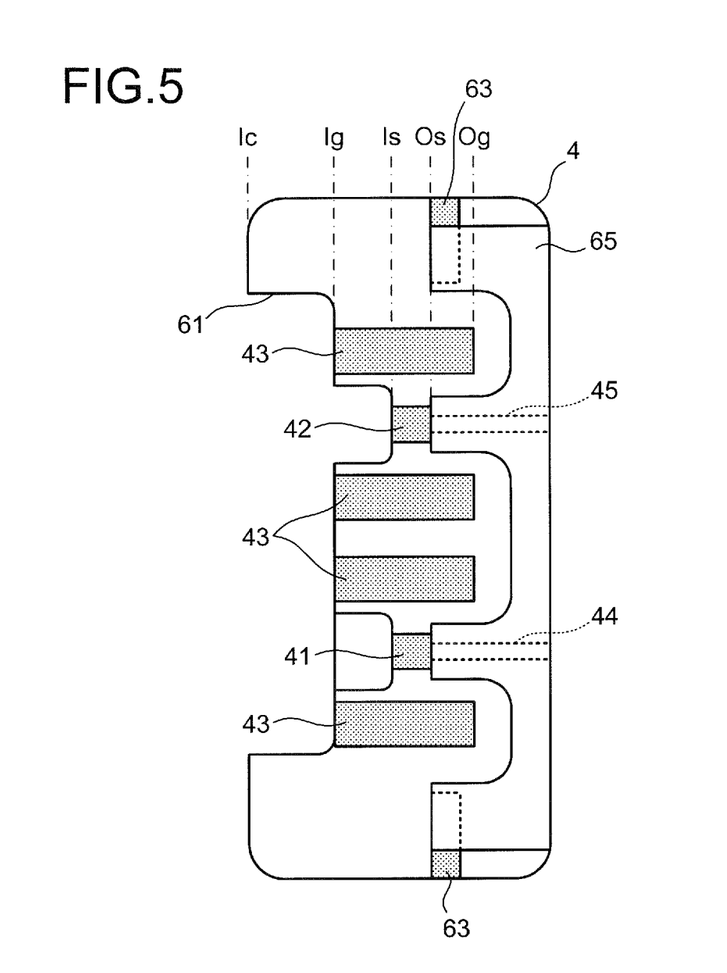
FIG. 5 is an explanatory diagram of an example of a back face of the flexible circuit board of the optical modulating apparatus according to the embodiment.

FIG. 5 is an explanatory diagram of an example of the back face of the flexible circuit board of the optical modulating apparatus according to the embodiment. As depicted in FIG. 5, on the back face of the flexible circuit board 4, signal terminals 41 and 42, and ground terminals 43 are disposed at positions respectively corresponding to the signal terminals 27 and 26, and the ground terminals 28 on the front face of the flexible circuit board 4. The signal terminals 41 and 42 on the back face of the flexible circuit board 4 are respectively connected to signal line paths 44 and 45 that extend to the end of the flexible circuit board 4, on the side facing the optical modulating device 3. In FIG. 5, the end of the flexible circuit board 4, on the side facing the optical modulating device 3 is the right-hand side end thereof. FIG. 5 depicts a simplified drawing and depicts the signal terminals 41 and 42 and the ground terminals 43 as terminals each having a non-winding shape.

The signal terminal 26 on the front face of the flexible circuit board 4 and the signal terminal 42 on the back face thereof are electrically connected to each other via a through hole (not depicted). The signal terminal 27 on the front face of the flexible circuit board 4 and the signal terminal 41 on the back face thereof are electrically connected to each other via a through hole not depicted. The ground terminals 28 on the front face of the flexible circuit board 4 and the ground terminals 43 on the back face thereof are electrically connected to each other via through holes (not depicted). Thus, the ground is enhanced. As described later, when the signal terminals 26 and 27 and the ground terminals 28 on the front face of the flexible circuit board 4 are soldered to the signal electrode pads 31 and 32 and the ground electrode pad 33 on the back face of the driver 2, the signal terminals 41 and 42, and the ground terminals 43 on the back face of the flexible circuit board 4 are usable as alignment markers.

Figure 6:
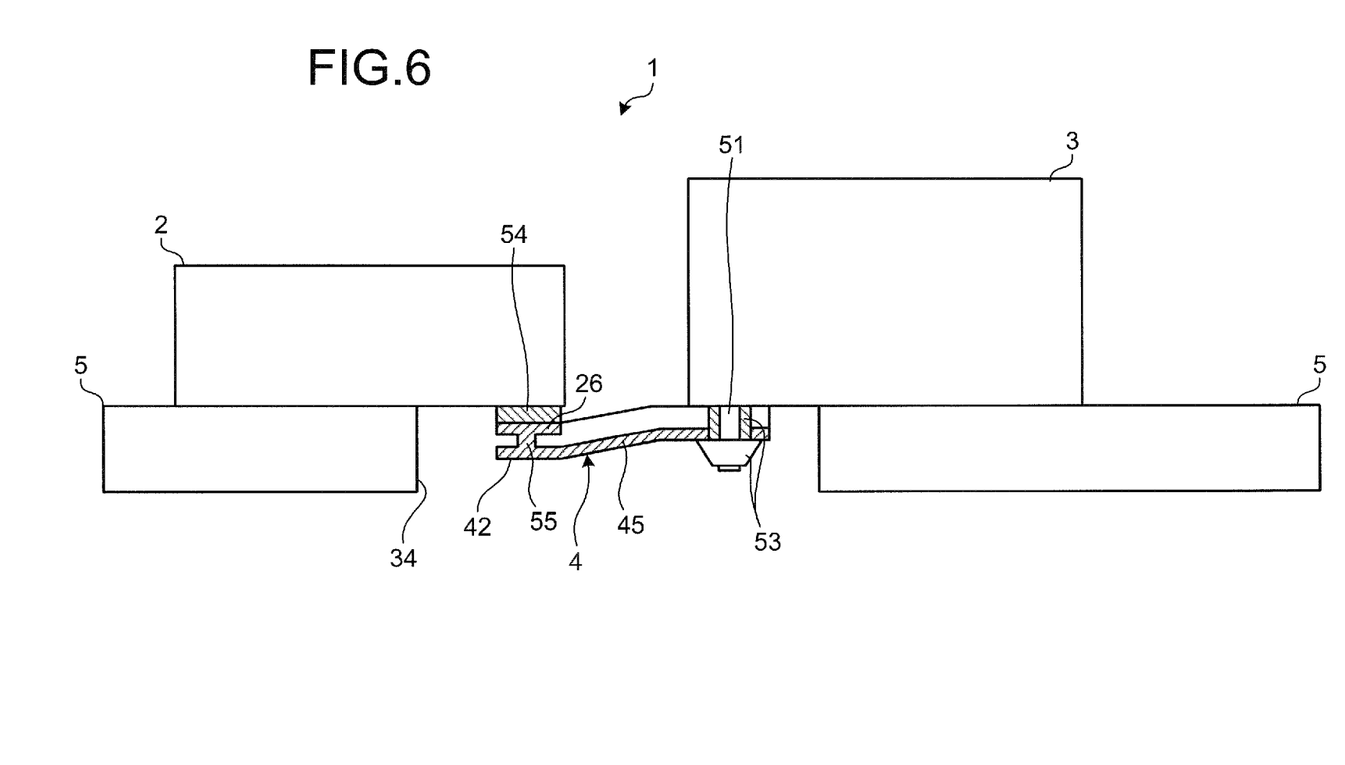
FIG. 6 is an explanatory diagram of an example of a cross-section taken along a line A-A in FIG. 1.
Figure 7:
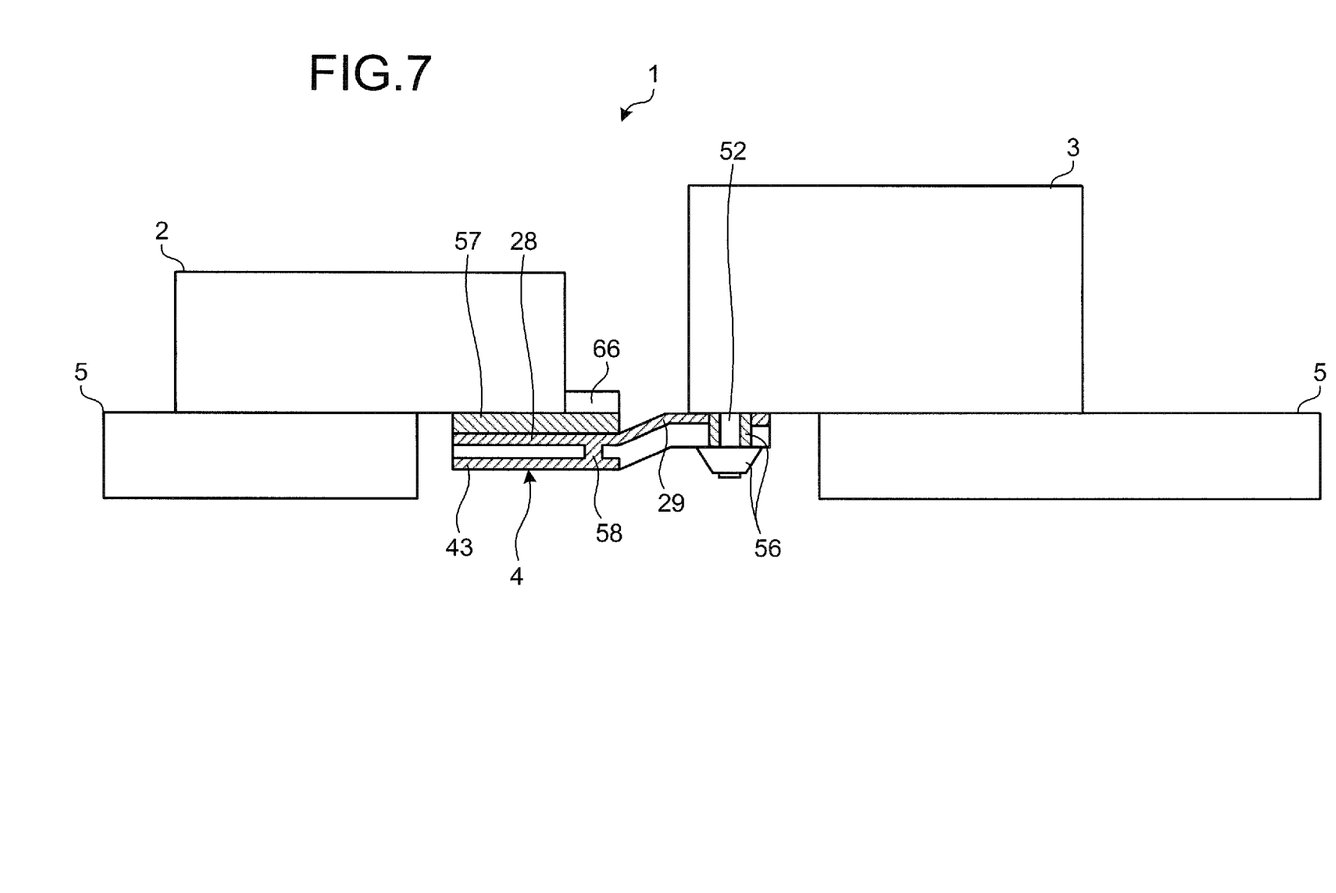
FIG. 7 is an explanatory diagram of an example of a cross-section taken along a line B-B in FIG. 1.

FIG. 6 is an explanatory diagram of an example of a cross-section taken along a line A-A in FIG. 1. The cross-section taken along the line A-A is a cross-section crossing the signal terminal 26 of the flexible circuit board 4. FIG. 7 is an explanatory diagram of an example of a cross-section taken along a line B-B in FIG. 1. The cross-section taken along the line B-B is a cross-section crossing the ground terminal 28 of the flexible circuit board 4.

As depicted in FIGS. 6 and 7, the optical modulating device 3 is mounted on the printed circuit board 5 to oppose the driver 2 across the opening 34 of the printed circuit board 5. The flexible circuit board 4 is disposed in the opening 34 of the printed circuit board 5.

For example, a lead pin 51 electrically connected to a signal electrode not depicted in the optical modulating device 3 and a lead pin 52 electrically connected to a ground electrode not depicted in the optical modulating device 3 may protrude from the optical modulating device 3. For example, the lead pins 51 and 52 of the optical modulating device 3 may be inserted into the through holes of the flexible circuit board 4.

For example, the lead pin 51 on the signal electrode side may be electrically connected by solder 53 to the signal line paths 45 and 44 that extend from the signal terminals 42 and 41 on the back face of the flexible circuit board 4. For example, the signal terminal 42 on the back face of the flexible circuit board 4 may be electrically connected to the signal terminal 26 on the front face of the flexible circuit board 4 through a through hole 55 of the flexible circuit board 4. The signal terminal 26 on the front face of the flexible circuit board 4 is electrically connected by solder 54 to the signal electrode pad 31 on the back face of the driver 2.

Though not depicted, for example, the signal terminal 41 on the back face of the flexible circuit board 4 may be electrically connected to the signal terminal 27 on the front face of the flexible circuit board 4 through a through hole of the flexible circuit board 4. The signal terminal 27 on the front face of the flexible circuit board 4 is electrically connected by solder to the signal electrode pad 32 on the back face of the driver 2.

For example, the lead pin 52 on the ground electrode side may be electrically connected by solder 56 to the connecting portion 29 that extends from the ground terminals 28 on the front face of the flexible circuit board 4. The ground terminals 28 on the front face of the flexible circuit board 4 are electrically connected by solder 57 to the ground electrode pad 33 on the back face of the driver 2. For example, the ground terminals 28 on the front face of the flexible circuit board 4 may be electrically connected to the ground terminals 43 on the back face of the flexible circuit board 4 through a through hole 58 of the flexible circuit board 4.

Using a soldering iron, a worker may manually solder the signal terminal 26 on the front face of the flexible circuit board 4 to the signal electrode pad 31 on the back face of the driver 2. The worker may also manually solder the signal terminal 27 on the front face of the flexible circuit board 4 to the signal electrode pad 32 on the back face of the driver 2, and the ground terminals 28 on the front face of the flexible circuit board 4 to the ground electrode pad 33 on the back face of the driver 2.

Example of Assembly Procedure

The driver 2 and other non-depicted circuit parts to be mounted on the surface are first soldered to the front face of the printed circuit board 5 in a soldering process using, for example, reflow. Thereafter, using a soldering iron and a wire solder, a worker solders one end of the flexible circuit board 4 to the lead pins 51 and 52 extending from the optical modulating device 3. The worker inserts the flexible circuit board 4 into the opening 34 of the printed circuit board 5, and solders the other end of the flexible circuit board 4 to the back face of the driver 2 by applying the soldering iron and the wire solder from the back face side of the printed circuit board 5.

According to the first example of the optical modulating apparatus, the printed circuit board 5 is provided with the opening; and in the opening 34, the soldering iron can be applied from the back face side of the printed circuit board 5 to the soldering point for the flexible circuit board 4 connected to the optical modulating device 3 and the back face of the driver 2. Therefore, even when the space between the driver 2 and the optical modulating device 3 is small, the optical modulating device 3 can be mounted on the front face of the printed circuit board 5. Thus, the optical modulating device 3 has excellent mounting properties.

The optical modulating apparatus 1 may include an alignment mechanism that adjusts the positions of the signal terminals 26 and 27 and the ground terminals 28 of the flexible circuit board 4 with respect to those of the signal electrode pads 31 and 32 and the ground electrode pad 33 of the driver 2. Thereby, alignment is facilitated when the driver 2 is soldered to the flexible circuit board 4. When the alignment mechanism completes adjustment of the positions of the signal terminals 26 and 27 and the ground terminals 28 of the flexible circuit board 4: the signal terminals 26 and 27, and the ground terminals 28 are soldered to the signal electrode pads 31 and 32 as well as to the ground electrode pad 33, whereby impedance mismatching caused by misalignment can be suppressed and a stable high-frequency property can be acquired.

For example, as depicted in FIGS. 2 to 5, the end (the left-hand side end in FIG. 4) of the flexible circuit board, on the side facing the driver 2, may be formed into a shape complementary to the shape of the edge (the left-hand side edge in FIG. 3) of the opening 34 of the printed circuit board 5, on the side facing the driver 2, as an example of the alignment mechanism. The end of the flexible circuit board 4, on the side facing the driver 2, is abutted to the edge of the opening 34 of the printed circuit board 5, on the side facing the driver 2, and thereby, the positions can be easily adjusted of the signal terminals 26 and 27 and the ground terminals 28 of the flexible circuit board 4 with respect to those of the signal electrode pads 31 and 32, and the ground electrode pad 33 of the driver 2.

As depicted in FIGS. 4 and 5, a recess 61 may be formed at the position corresponding to the signal electrode pads 31 and 32, and the ground electrode pad 33 of the driver 2, at the end of the flexible circuit board 4, on the side facing the driver 2. On the flexible circuit board 4, a position corresponding to the end, on the side facing the driver 2 is denoted by "Ic", a position corresponding to the ends of the ground terminals 28, on the side facing the driver 2 is denoted by "Ig", and a position corresponding to the signal terminals 26 and 27, on the side facing the driver 2, is denoted by "Is". The recess 61 causes 1g and 1s to be positioned closer to the optical modulating device 3 than 1c is, that is, to be on the right of 1c in FIGS. 4 and 5.

When the end of the flexible circuit board 4, on the side facing the driver 2, is abutted to the edge of the opening 34 of the printed circuit board 5, on the side facing the driver 2, the recess 61 forms a sufficient gap to pour the solder between the edge of the opening 34 of the printed circuit board 5 (on the side facing the driver 2) and the signal terminals 26 and 27, and the ground terminals 28 of the flexible circuit board 4. Therefore, by providing the recess 61, the solder can be poured into the soldering point when the driver 2 is soldered to the flexible circuit board 4 using a soldering iron applying the soldering iron from the back face side of the printed circuit board 5.

For example, as depicted in FIG. 4, an alignment marker 62 may be disposed at a position Os that is on the front face of the flexible circuit board 4 and that corresponds to the ends of the signal terminals 26 and 27 of the flexible circuit board 4, on the side facing the optical modulating device 3, as another example of the alignment mechanism. The alignment marker 62 may have a thickness to be substantially abutted to the end face of the driver 2, on the side facing the optical modulating device 3, and may be formed by a metal such as, for example, copper. The alignment marker 62 is abutted to the end face of the driver 2, on the side facing the optical modulating device 3, and thereby, the positions can easily be adjusted of the signal terminals 26, 27, 41, and 42 and the ground terminals 28 and 43 of the flexible circuit board 4 with respect to those of the signal electrode pads 31 and 32, and the ground electrode pad 33 of the driver 2.

As depicted in FIG. 5, on the back face of the flexible circuit board 4, another alignment marker 63 may further be disposed at the position that corresponds to the alignment marker 62 on the front face of the flexible circuit board 4. Thereby, presence or absence of any misalignment can be checked from the back face side of the printed circuit board 5 when the signal terminals 26 and 27, and the ground terminals 28 on the front face of the flexible circuit board 4 are soldered to the signal electrode pads 31 and 32, and the ground electrode pad 33 on the back face of the driver 2.

As depicted in FIG. 4, at least a portion of the alignment marker 62 on the front face of the flexible circuit board 4 may be exposed without being covered by a cover layer 64 that covers the front face of the flexible circuit board 4. Thereby, the alignment marker 63 on the back face can easily be abutted to the end face of the driver 2, on the side facing the optical modulating device 3, while checking the alignment marker 62 that is on the front face of the flexible circuit board 4 and that can be seen through the flexible circuit board 4 from the back face side of the flexible circuit board 4.

As depicted in FIG. 5, at least a portion of the alignment marker 63 on the back face of the flexible circuit board 4 may be exposed without being covered by a cover layer 65 that covers the back face of the flexible circuit board 4. Thereby, the alignment marker 63 on the back face of the flexible circuit board 4 can easily be seen and presence or absence of any misalignment can easily be checked from the back face side of the printed circuit board 5 when the soldering is executed.

As depicted in FIG. 4, the end, on the side facing the driver 2, of the cover layer 64 covering the front face of the flexible circuit board 4 may extend to the position Os that corresponds to the end of the signal terminals 26 and 27 of the flexible circuit board 4, on the side facing the optical modulating device 3. Thereby, the end of the cover layer 64 on the front face can be aligned with the end face of the driver 2, on the side facing the optical modulating device 3, while checking the cover layer 64 that is on the front face of the flexible circuit board 4 and visible through the flexible circuit board 4 from the back face side of the flexible circuit board 4. When the soldering is executed, using the cover layer 64 on the front face of the flexible circuit board 4, the positions of the signal terminals 26 and 27, and the ground terminals 28 of the flexible circuit board 4 can easily be adjusted with respect to the positions of the signal electrode pads 31 and 32, and the ground electrode pad 33 of the driver 2.

As depicted in FIG. 5, the end, on the side facing the driver 2, of the cover layer 65 covering the back face of the flexible circuit board 4 may extend to the position Os that corresponds to the end of the signal terminals 41 and 42 of the flexible circuit board 4, on the side facing the optical modulating device 3. Thereby, the end of the cover layer 65 on the back face can be aligned with the end face of the driver 2, on the side facing the optical modulating device 3, while checking the cover layer 65 on the back face of the flexible circuit board 4. When the soldering is executed, using the cover layer 65 on the back face of the flexible circuit board 4, the positions of the signal terminals 41 and 42, and the ground terminals 43 of the flexible circuit board 4 can easily be adjusted with respect to those of the signal electrode pads 31 and 32, and the ground electrode pad 33 of the driver 2.

As depicted in FIG. 3 or 7, the driver 2 may include a lead pin 66 to be electrically connected to the ground electrode pad 33 of the driver 2. The ground terminals 28 of the flexible circuit board 4 may be soldered to the ground electrode pad 33 and the lead pin 66 of the driver 2. Thereby, the solder contact area between the driver 2 and the flexible circuit board 4 can sufficiently be acquired, whereby the ground becomes excellent. The bonding strength between the driver 2 and the flexible circuit board 4 is sufficiently increased.

As depicted in FIG. 4, the ground terminals 28 of the flexible circuit board 4 may extend to positions closer to the optical modulating device 3 than the signal terminals 26 and 27 of the flexible circuit board 4 do. On the flexible circuit board 4, denoting a position corresponding to the end of the ground terminal 28 on the side facing the optical modulating device 3 by "Og", Og is located at a position that is closer to the optical modulating device 3 than the position Os that corresponds to the end of the signal terminals 26 and 27, on the side facing the optical modulating device 3, that is, on the right thereof in FIG. 4. Thereby, the areas of the ground terminals 28 become larger than the areas of the signal terminals 26 and 27 and therefore, the ground becomes excellent and the bonding strength between the driver 2 and the flexible circuit board 4 is sufficiently increased.

As depicted in FIG. 4, the ground terminals 28 of the flexible circuit board 4 may extend to positions closer to the driver 2 than the signal terminals 26 and 27 of the flexible circuit board 4 do. On the flexible circuit board 4, the position Ig corresponding to the end of the ground terminals 28, on the side facing the driver 2, is located at a position closer to the driver 2 than the position Is is that corresponds to the end of the signal terminals 26 and 27, on the side facing the driver 2, that is, on the left thereof in FIG. 4. Thus, the areas of the ground terminals 28 become larger than the areas of the signal terminals 26 and 27 and therefore, the ground becomes excellent and the bonding strength between the driver 2 and the flexible circuit board 4 is sufficiently increased.

As depicted in FIG. 4, on the flexible circuit board 4, the signal terminals 26 and 27 may each be smaller than the ground terminal 28. Thereby, the capacitance component of each of the signal terminals 26 and 27 becomes small and the impedance matching can easily be established, whereby an excellent high-frequency property can be acquired.

Figure 8:
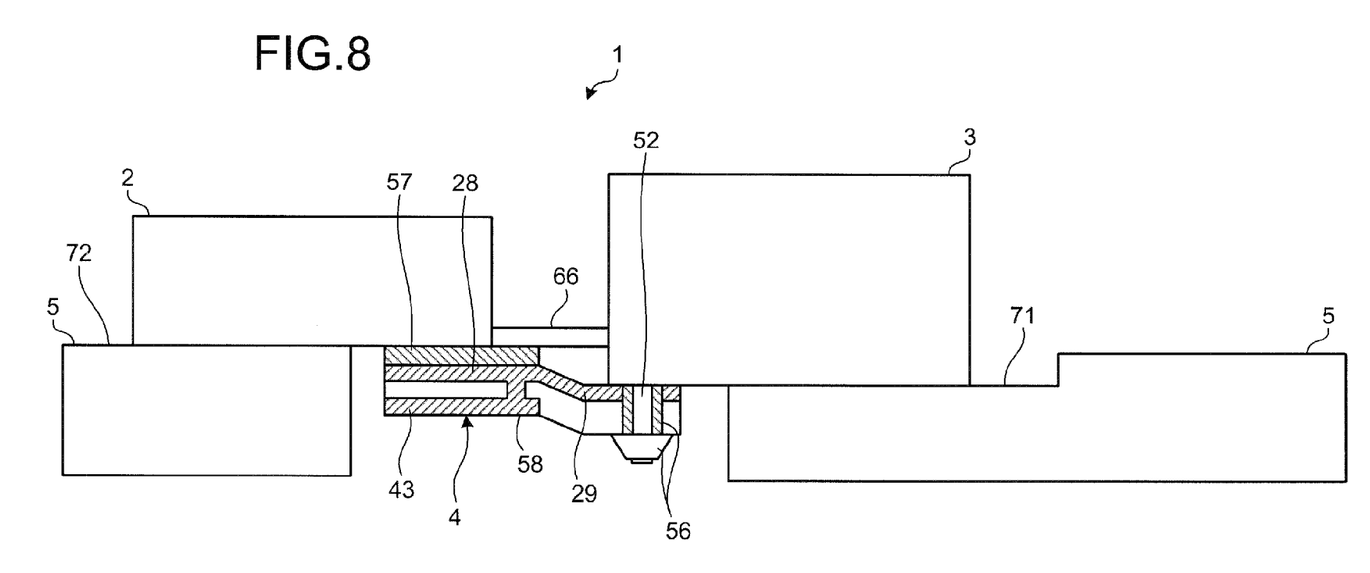
FIG. 8 is an explanatory diagram of another example of the cross-section taken along the line B-B of FIG. 1.

FIG. 8 is an explanatory diagram of another example of the cross-section taken along the line B-B of FIG. 1. As depicted in FIG. 8, on the printed circuit board 5, a portion 71 at which the optical modulating device 3 is mounted may be lower than a portion 72 at which the driver 2 is mounted. Thereby, the end face of the optical modulating device 3, on the side facing the driver 2, can be abutted to the lead pin 66 that is electrically connected to the ground electrode pad 33 of the driver 2. The end face of the optical modulating device 3, on the side facing the driver 2, is abutted to the lead pin 66 of the driver 2 and thereby, the positions of the signal terminals 26 and 27, and the ground terminals 28 of the flexible circuit board 4 can be easily adjusted with respect to the positions of the signal electrode pads 31 and 32, and the ground electrode pad 33 of the driver 2.

Figure 9:
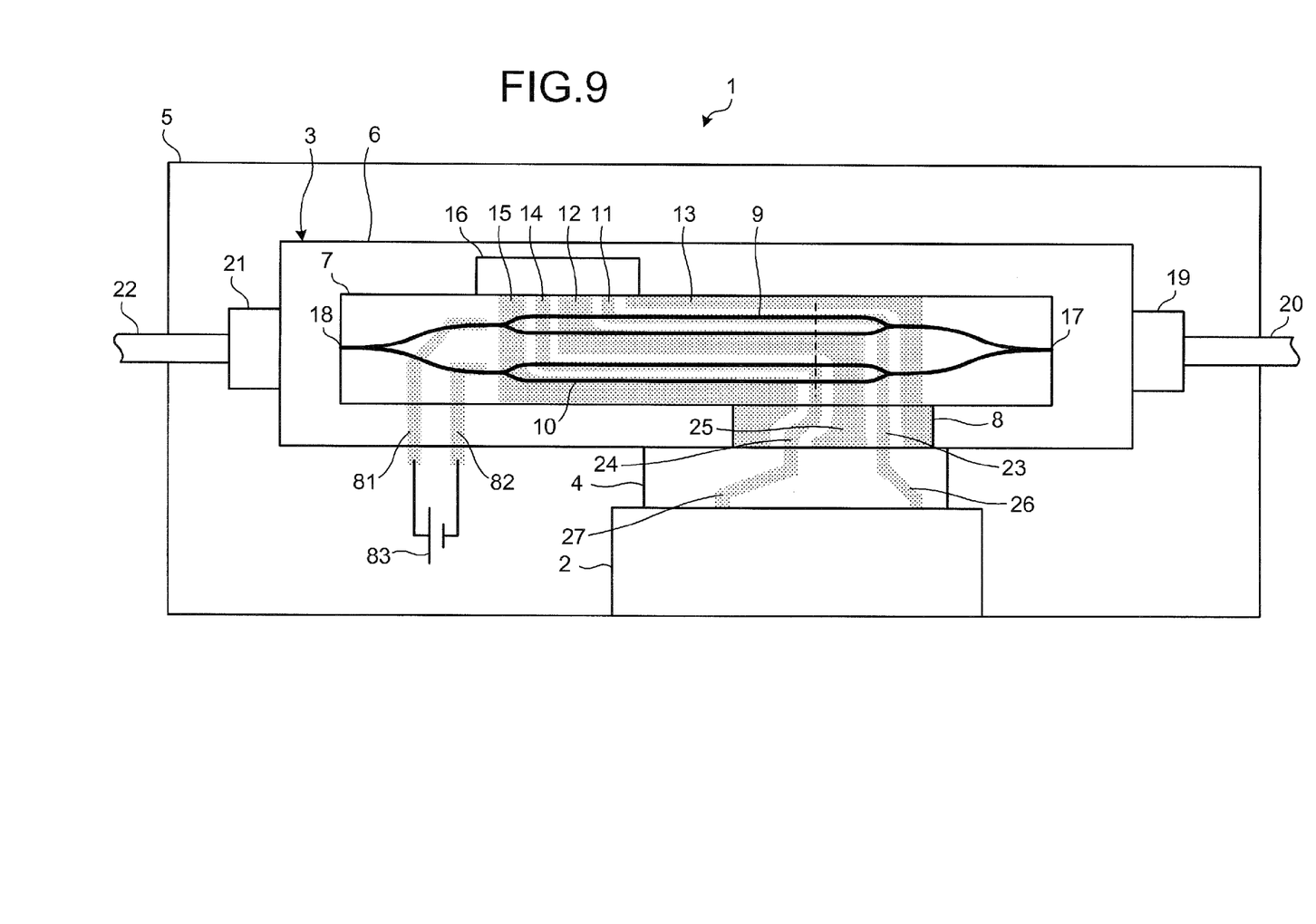
FIG. 9 is an explanatory diagram of a second example of the optical modulating apparatus according to the embodiment.

FIG. 9 is an explanatory diagram of a second example of the optical modulating apparatus according to the embodiment. The optical modulating apparatus 1 depicted in FIG. 9 additionally includes DC electrodes 81 and 82 respectively along the output waveguides of the first and the second Mach-Zehnder optical waveguides 9 and 10 in the optical modulating apparatus 1 depicted in FIG. 1. In the optical modulating apparatus 1 depicted in FIG. 9, a bias 83 may be supplied to the DC electrodes 81 and 82 and thereby, the phase of the output from the two Mach-Zehnder optical waveguides 9 and 10 may be adjusted such that the output has a phase difference of 90 degrees.

The output from the Mach-Zehnder optical waveguides 9 and 10 may be modulated based on differential phase shift keying (DPSK) that modulates the output from each of the Mach-Zehnder optical waveguides 9 and 10 using two values of "0" and "π". Thus, according to the second example of the optical modulating apparatus, a quadrature phase shift keying (QPSK) modulation signal can be generated. Other components of the second example are identical to those of the optical modulating apparatus 1 depicted in FIG. 1 and therefore, are given the same reference numerals used in FIG. 1 and are not again described.

Figure 10:
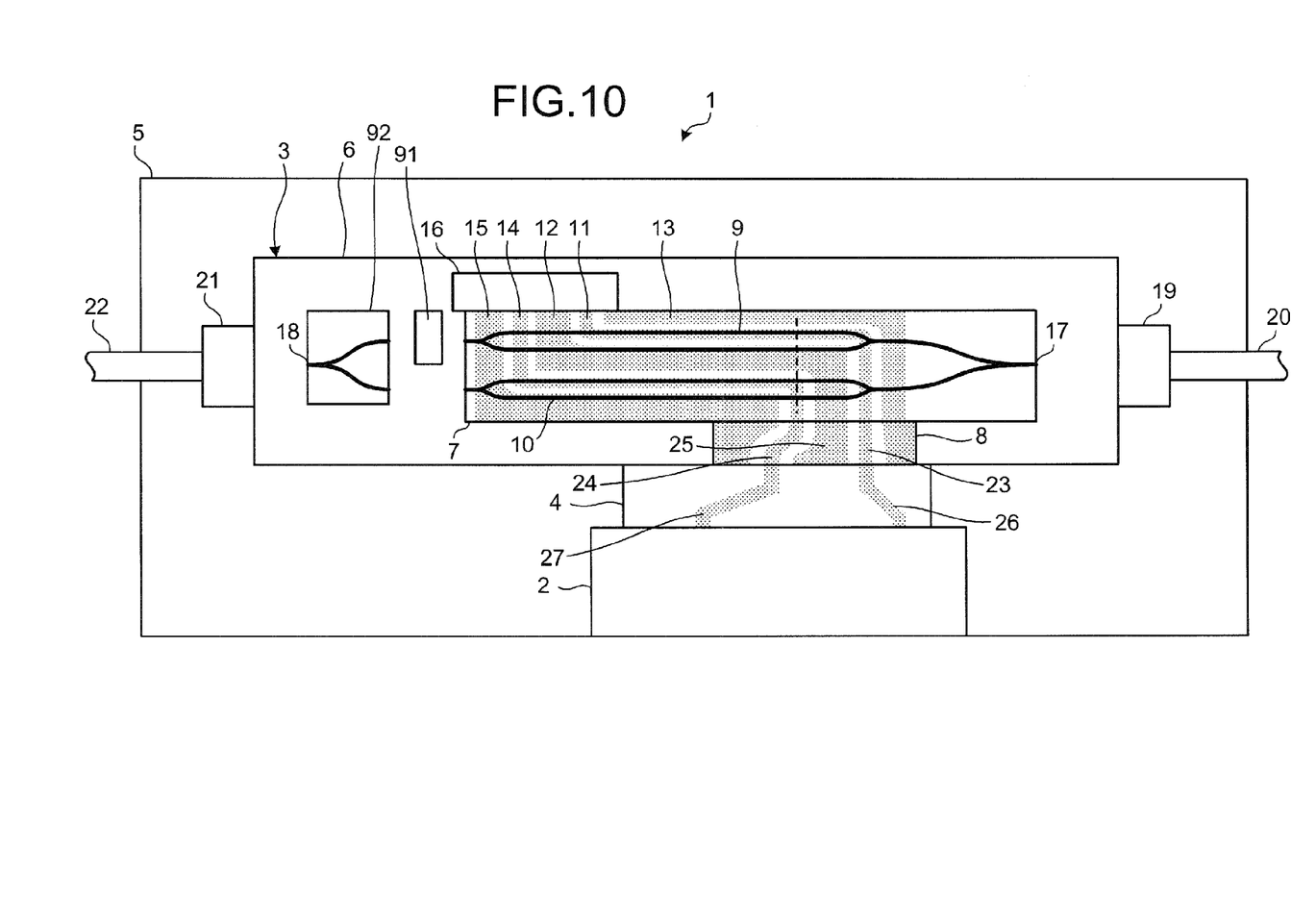
FIG. 10 is an explanatory diagram of a third example of the optical modulating apparatus according to the embodiment.

FIG. 10 is an explanatory diagram of a third example of the optical modulating apparatus according to the embodiment. In the optical modulating apparatus 1 depicted in FIG. 10, the output from the first Mach-Zehnder optical waveguide 9 whose polarization beam is rotated by 90 degrees by a polarization beam rotating device 91 is coupled with the output from the second Mach-Zehnder optical waveguide 10 by a polarization beam combiner (PBC) 92 in the optical modulating apparatus 1 depicted in FIG. 1. Thereby, according to the third example of the optical modulating apparatus, the polarization beam multiplexed signal can be generated and output from the polarization beam combiner 92. Other configurations of the third example are identical to those of the optical modulating apparatus 1 depicted in FIG. 1 and therefore, are given the same reference numerals used in FIG. 1 and are not again described.

Figure 11:
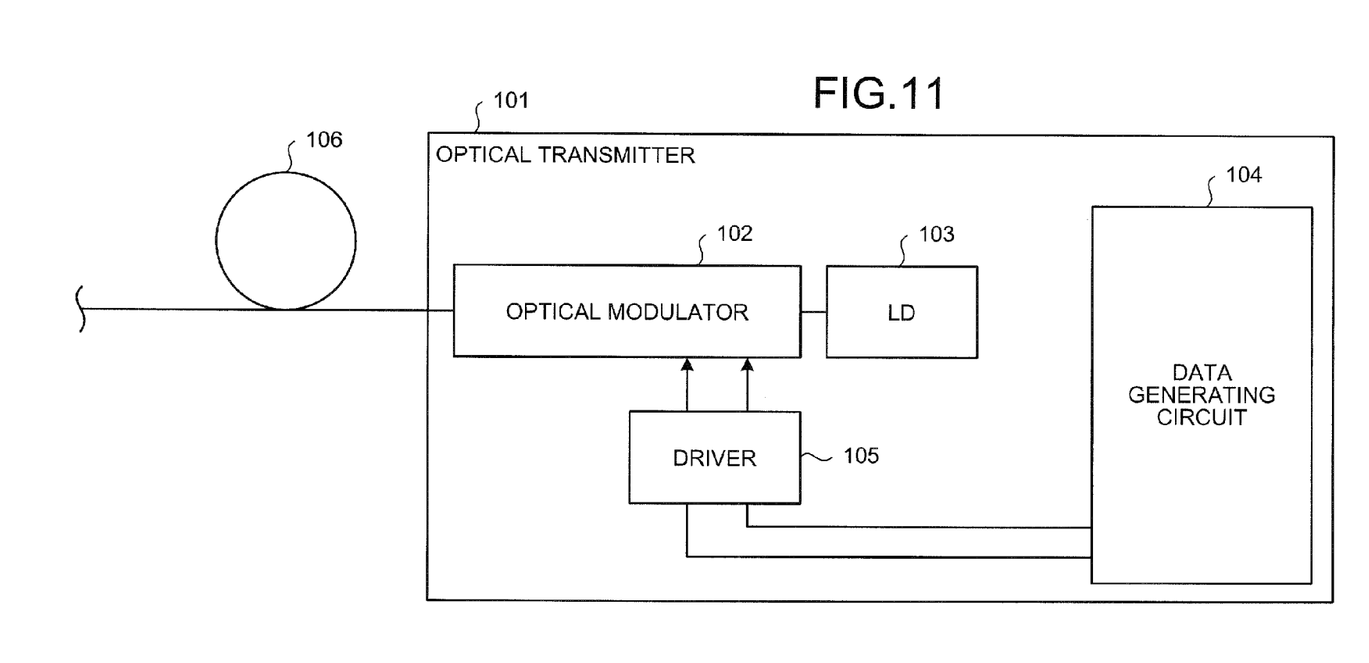
FIG. 11 is an explanatory diagram of an example of an optical transmitter according to the embodiment.

FIG. 11 is an explanatory diagram of an example of an optical transmitter according to the embodiment. As depicted in FIG. 11, the optical transmitter 101 includes an optical modulator 102, a light emitting element 103, a data generating circuit 104, and a driver 105.

The light emitting element 103 emits a light beam. A laser diode (LD) is an example of the light emitting element 103. The data generating circuit 104 generates modulation data. The driver 105 generates an electrical signal having an amplitude that corresponds to the modulation data output from the data generating circuit 104. The optical modulating unit 102 executes the modulation of the light beam emitted from the light emitting element 103, based on the electrical signal output from the driver 105. The optical modulating apparatus 1 depicted in each of the FIGS. 1, 9, and 10 is an example of the optical modulator 102 and the driver 105 of the optical transmitter 101. The light beam output from the optical modulator 102 may be output to an optical fiber 106 through a connector not depicted.

According to the optical transmitter depicted in FIG. 11, use of the optical modulating apparatus 1 depicted in each of FIGS. 1, 9 and 10 as the optical modulator 102 and the driver 105 enables excellent mounting properties of the optical modulator 102. Even when the pitch of the signal electrode pad on the back face is wider than the pitch of the signal electrode of the modulator chip substrate, conversion of the pitch on the flexible circuit substrate can be performed.

The optical modulating apparatus 1 depicted in each of FIGS. 1, 9, and 10 includes two Mach-Zehnder optical waveguides, two signal electrodes, two signal terminals, two signal electrode pads, and two signal line paths. However, the above is similarly applied to a case where the optical modulating apparatus 1 includes two or more Mach-Zehnder optical waveguides, signal electrodes, signal terminals, signal electrode pads, and signal line paths, respectively.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulating apparatus comprising:
   a driver that includes a signal electrode pad and a ground electrode pad on a back face of the driver, the signal electrode pad outputting an electrical signal corresponding to modulation data;
   an optical modulating device that modulates a light beam based on the electrical signal output from the driver;
   a flexible circuit board that includes a signal terminal and a ground terminal; and
   a printed circuit board that has an opening penetrating from a front face of the printed circuit board to a back face of the printed circuit board, wherein
   the driver is mounted on the printed circuit board such that the signal electrode pad and the ground electrode pad of the driver are exposed in the opening of the printed circuit board,
   the optical modulating device is mounted on the printed circuit board, opposing the driver across the opening of the printed circuit,
   the flexible circuit board is disposed in the opening of the printed circuit board,
   an end of the signal terminal of the flexible circuit board is electrically connected to a signal electrode of the optical modulating device,
   an end of the ground terminal of the flexible circuit board is electrically connected to a ground electrode of the optical modulating device,
   another end of the signal terminal of the flexible circuit board is soldered to the signal electrode pad of the driver, and another end of the ground terminal of the flexible circuit board is soldered to the ground electrode pad of the driver.

2. The optical modulating apparatus according to claim 1, further comprising
an alignment mechanism that adjusts positions of the signal terminal and the ground terminal of the flexible circuit board with respect to positions of the signal electrode pad and the ground electrode pad of the driver, wherein
the signal terminal and the ground terminal are soldered to the signal electrode pad and the ground electrode pad of the driver with the positions of the signal terminal and the ground terminal of the flexible circuit board being in an adjusted state.

3. The optical modulating apparatus according to claim 2, wherein
an end of the flexible circuit board, on a side facing the driver, is formed in a shape that is complementary to a shape of an edge of the opening of the printed circuit board, on a side facing the driver, wherein
the alignment mechanism adjusts the positions of the signal terminal and the ground terminal of the flexible circuit board with respect to the positions of the signal electrode pad and the ground electrode pad of the driver, by an abutting of the end of the flexible circuit board, on the side facing the driver, to the edge of the opening of the printed circuit board, on the side facing the driver, and
recesses are formed at points that are on the side of the flexible circuit board, facing the driver, and that correspond to the signal electrode pad and the ground electrode pad of the driver of the end, such that gaps are formed for solder to be poured between the end of the flexible circuit board, on the side facing the driver, and the edge of the opening of the printed circuit board, on the side facing the driver, in a state where the end of the flexible circuit board, on the side facing the driver, is abutted to the edge of the opening of the printed circuit board, on the side facing the driver.

4. The optical modulating apparatus according to claim 2, wherein
an alignment marker having a thickness to be abutted to an end face of the driver, on the side facing the optical modulating device, is disposed at a position that is on the front face of the flexible circuit board and that corresponds to the end of signal terminal of the flexible circuit board, on the side facing the optical modulating device, and
the alignment mechanism adjusts the positions of the signal terminal and the ground terminal of the flexible circuit board with respect to the positions of the signal electrode pad and the ground electrode pad of the driver based on abutting of the alignment marker to the end face of the driver, on the side facing the optical modulating device.

5. The optical modulating apparatus according to claim 4, further comprising
another alignment marker that is disposed at a position that is on the back face of the flexible circuit board and that corresponds to the position of the alignment marker on the front face of the flexible circuit board.

6. The optical modulating apparatus according to claim 4, wherein
at least a portion of the alignment marker is exposed without being covered by a cover layer that covers the flexible circuit board.

7. The optical modulating apparatus according to claim 1, further comprising
a cover layer that covers the flexible circuit board and an end of which, on a side facing the driver, extends to a position that corresponds to a position of the end of the signal terminal of the flexible circuit board, on a side facing the optical modulating device.

8. The optical modulating apparatus according to claim 1, wherein
the driver includes a lead pin that is electrically connected to the ground electrode pad of the driver, and
the ground terminal of the flexible circuit board is soldered to the ground electrode pad and the lead pin of the driver.

9. The optical modulating apparatus according to claim 8, wherein
a portion of the printed circuit board at which the optical modulating device mounted is lower than a portion of the printed circuit board at which the driver mounted.

10. The optical modulating apparatus according to claim 1, wherein
the ground terminal of the flexible circuit board extends closer to the optical modulating device than the signal terminal of the flexible circuit board does.

11. The optical modulating apparatus according to claim 1, wherein
the ground terminal of the flexible circuit board extends closer to the driver than the signal terminal of the flexible circuit board does.

12. The optical modulating apparatus according to claim 1, wherein
the signal terminal of the flexible circuit board is smaller than the ground terminal.

13. The optical modulating apparatus according to claim 1, wherein
the optical modulating device is a QPSK modulating device.

14. The optical modulating apparatus according to claim 1, wherein
the optical modulating device is a polarization beam multiplex modulating device.

15. An optical transmitter comprising:
a light emitting element that emits a light beam;
a data generating circuit that generates modulation data;
a driver that includes a signal electrode pad and a ground electrode pad on a back face of the driver, the signal electrode pad outputting an electrical signal corresponding to the modulation data output from the data generating circuit;
an optical modulating device that modulates the light beam based on the electrical signal output from the driver;
a flexible circuit board that includes a signal terminal and a ground terminal; and
a printed circuit board that has an opening penetrating from a front face of the printed circuit board to a back face of the printed circuit board, wherein
the driver is mounted on the printed circuit board such that the signal electrode pad and the ground electrode pad of the driver are exposed in the opening of the printed circuit board,
the optical modulating device is mounted on the printed circuit board, opposing the driver across the opening of the printed circuit,
the flexible circuit board is disposed in the opening of the printed circuit board,
an end of the signal terminal of the flexible circuit board is electrically connected to a signal electrode of the optical modulating device, an end of the ground terminal of the flexible circuit board is electrically connected to a ground electrode of the optical modulating device, another end of the signal terminal of the flexible circuit board is soldered to the signal electrode pad of the driver, and another end of the ground terminal of the flexible circuit board is soldered to the ground electrode pad of the driver.

\* \* \* \* \*